US011981539B2

(12) United States Patent
Wurth et al.

(10) Patent No.: US 11,981,539 B2
(45) Date of Patent: May 14, 2024

(54) SYSTEM FOR DETECTING ELEVATOR MOVEMENT

(71) Applicant: Lift AI, LLC, Toledo, OH (US)

(72) Inventors: Robert Wurth, San Francisco, CA (US); Bruce Giese, Austin, TX (US); Jerrod Kuhn, Ottawa Hills, OH (US)

(73) Assignee: LIFT VENTURES, INC., Birmingham, MI (US)

( * ) Notice: Subject to any disclaimer, the term of this patent is extended or adjusted under 35 U.S.C. 154(b) by 1345 days.

(21) Appl. No.: 16/504,721

(22) Filed: Jul. 8, 2019

(65) Prior Publication Data

US 2020/0017333 A1 Jan. 16, 2020

Related U.S. Application Data

(60) Provisional application No. 62/696,023, filed on Jul. 10, 2018.

(51) Int. Cl.

*B66B 5/00* (2006.01)
*B66B 1/34* (2006.01)
*B66B 5/02* (2006.01)

(52) U.S. Cl.

CPC .......... *B66B 5/0037* (2013.01); *B66B 1/3461* (2013.01); *B66B 1/3492* (2013.01); *B66B 5/0018* (2013.01); *B66B 5/02* (2013.01); *B66B 2201/30* (2013.01)

(58) Field of Classification Search

CPC ... B66B 5/0037; B66B 1/3461; B66B 1/3492; B66B 5/0018; B66B 5/02; B66B 2201/30; B66B 5/0025

See application file for complete search history.

(56) References Cited

U.S. PATENT DOCUMENTS

2020/0087111 A1* 3/2020 Wos ...................... B66B 1/3461

* cited by examiner

*Primary Examiner* — Jeffrey Donels

(74) *Attorney, Agent, or Firm* — Shumaker, Loop & Kendrick, LLP; James D. Miller

(57) ABSTRACT

A system and method for remotely monitoring the operation of elevators to determine elevator shutdown. A control box is mounted to each elevator that includes one or more sensors that can detect movement of the elevator, a processor that can process data received from the sensors and a communications device that can transmit the processed data. The method includes determining a usage rate of movement of each of the elevators in the processor using the data, transmitting the usage rate from each of the communications devices to a remote server, and comparing the usage rate of each of the elevators to the usage rate of the other elevators in the server. The method then determines that one of the elevators has shut down or has a low performance if its usage rate is significantly different than the usage rate of the other elevators.

20 Claims, 2 Drawing Sheets

SYSTEM FOR DETECTING ELEVATOR MOVEMENT

CROSS-REFERENCE TO RELATED APPLICATIONS

This application claims the benefit of the filing date of U.S. Provisional Application No. 62/696,023, titled, System For Detecting Elevator Movement, filed Jul. 10, 2018.

BACKGROUND

Field

This disclosure relates generally to a system and method for monitoring the operation of elevators to determine elevator shutdown and, more particularly, to a system and method for remotely monitoring the movement of elevators in a bank of elevators to determine elevator shutdown using data from one or more sensors mechanically attached to each elevator, where the method compares the movement of the elevators to determine if any of the elevators is not operating as much as the other elevators.

Discussion of the Related Art

Elevator systems transport people throughout buildings and are typically an important part of the operation of the building, especially a high rise building, in that they must operate to reliably and quickly move persons from floor to floor. Elevator systems generally consist of complex electrical and mechanical systems that can fail to perform in the desired manner for a number of reasons over time and after continued use. The failure of an elevator system to perform as is intended can cause an elevator shutdown, which is an inconvenience for those who ride the elevators and can be costly to those who own or service the elevators. Thus, quickly determining elevator outages is very important for ensuring high quality of service to users. Hence, if an elevator stops operating or has other performance issues it must be reported as soon as possible so that maintenance personnel can service the elevator and reduce user inconvenience. Typically, a non-operating elevator is reported to a building manager, who usually is not on-site, by a user of the elevator, where the building manager then contacts the maintenance personnel.

A single building or group of buildings may have a wide variety of different types of elevators with different elevator controllers and different equipment. Connecting into many different types of elevators is very time consuming and difficult for the wide range of elevators that exist. For this reason, there is a significant need for monitoring elevator equipment which requires no connections into the elevator system. However, for random traffic use patterns, it can be difficult for a non-intrusive elevator monitoring device to determine if the elevator is truly stopped or is not supporting the intended rate of elevator trips. Thus, it would be desirable to provide a system which addresses the concerns described above.

SUMMARY

The following discussion discloses and describes a system and method for remotely monitoring the operation of elevators to determine elevator shutdown. A control box is mounted to each elevator that includes one or more sensors that can detect movement of the elevator, a processor that can process data received from the one or more sensors and a communications device that can transmit the processed data. The method includes determining a usage rate from movement of each of the elevators in the processor using the sensor data, transmitting the usage rate from each of the communications devices to a remote server, and comparing the usage rate of each of the elevators to the usage rate of the other elevators in the server. The method then determines that one of the elevators has shut down or has a low performance if its usage rate is significantly different than the usage rate of the other elevators. An alert message can be sent to a user device if it is determined that the usage rate of the one of the elevators indicates a shutdown or low performance. The one or more sensors can be an accelerometer that detects movement of the elevator, a microphone that detects sounds in and around the elevator, an altimeter that detects air pressure around the elevator, and a camera that detects motion in the elevator or motion of doors of the elevator.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for remotely monitoring the operation of elevators to determine elevator shutdown by comparing usage data of the elevators is merely exemplary in nature, and is in no way intended to limit the invention or its applications or uses.

As will be discussed in detail below, this disclosure proposes a system and method for remotely monitoring the operation of elevators in a bank of elevators to determine elevator shutdown, where the system provides for the non-intrusive monitoring of the elevators without being in electrical or mechanical communication with a controller for the elevator. It is noted that the system and method discussed below compares the usage data of two or more elevators in a bank of elevators to determine low or no performance of one of the elevators in the bank of elevators. However, the elevators whose usage data is being compared do not need to be limited to being in a bank of elevators. It is generally only necessary that the elevators whose usage data is being compared have similar activity, where the elevators can be in different banks of elevators, at different locations in a building, at different locations in a campus, such as a hospital or university, in the same city, etc.

The system includes a monitoring device mechanically attached to the elevator and including a number of non-intrusive sensors. As used herein, the term non-intrusive sensor means that the sensor is not in electrical or mechanical communication with the elevator controller. The sensors can be used to determine a usage rate for the elevator based on elevator trips in order to identify any elevators that are underutilized, stopped and/or out of service. Particularly, the monitoring device is configured to detect elevator activity using the one or more sensors, which may include one or more of elevator movement, the position of the elevator, motion in the elevator, movement of the doors of the elevator, etc. The monitoring device includes a communications device that enables the device to communicate data and information about the elevator activity to a remote server, and can be a cellular modem or another wireless or wired device. Thus, the system can reduce maintenance costs, outages, and improve the efficiency of the elevators in combination with the other elevators in the bank.

Figure 1:
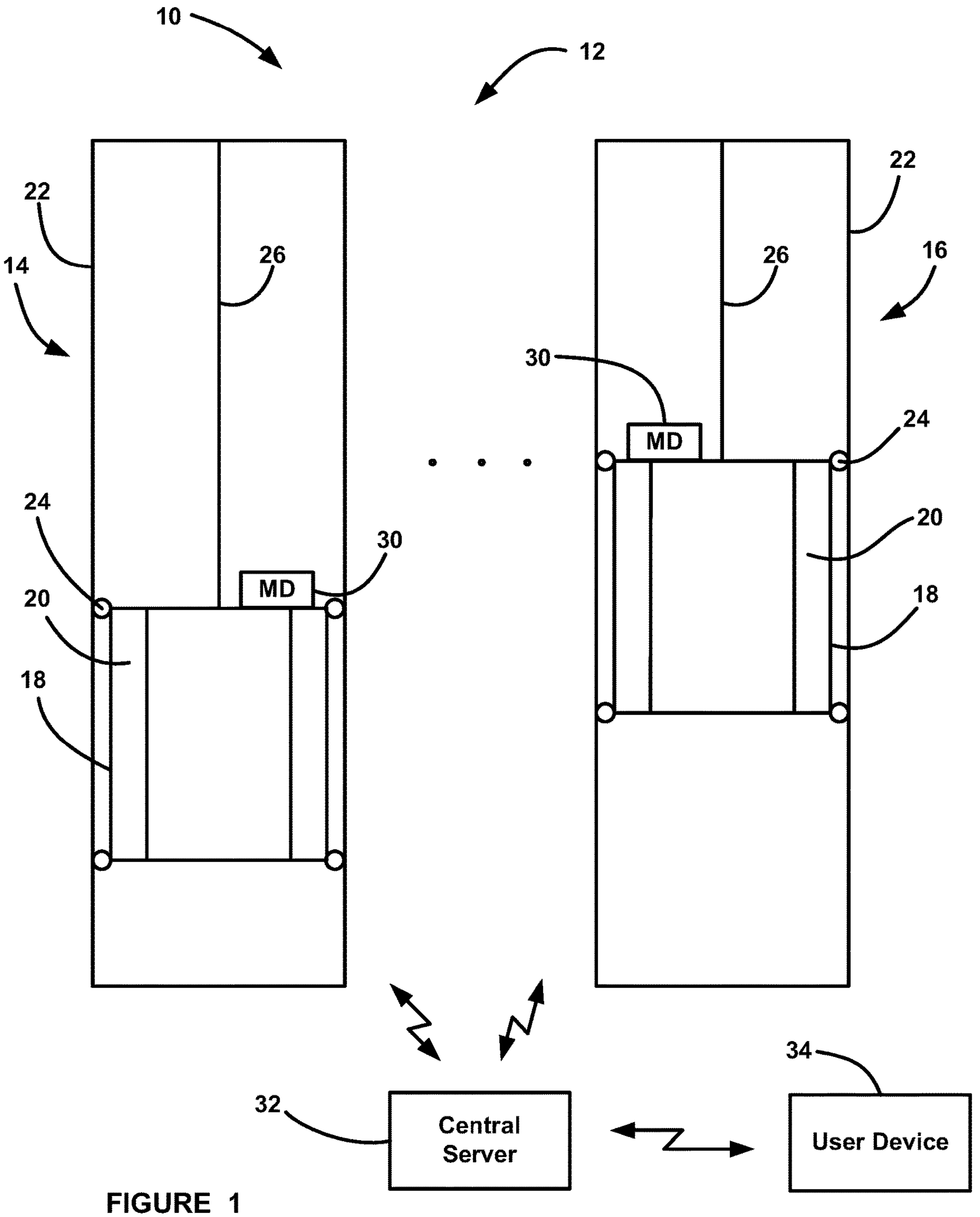
FIG. 1 is a block diagram of an elevator system including a bank of elevators and a monitoring device mechanically attached to each elevator in the bank that includes a number of sensors that provide signals related to elevator movement that are sent to a remote server.

FIG. 1 is a block diagram of an elevator system 10 that provides at least the features discussed above and is used in connection with, for example, a building, such as an office building, apartment building, warehouse, manufacturing facility, etc. The elevator system 10 includes a bank 12 of elevators represented as passenger elevators 14 and 16, where the number of elevators in the bank 12 can be any practical number. Although the elevators 14 and 16 are referred to herein as passenger elevators, the elevators 14 and 16 are intended to represent any type of elevator that can benefit from the discussion herein, such as freight elevators. Each elevator 14 and 16 includes an elevator car 18 having doors 20 and that travels in a hoistway 22 on roller guides 24 by operation of a cable 26 between building floors in the usual manner. A separate monitoring device (MD) 30 is mechanically mounted, such as by screws or double-sided tape, to the elevators 14 and 16 at any suitable location thereon, such as a top panel. As will be discussed in detail below, the monitoring device 30 wirelessly provides data, information, measurements, etc. to a remote server 32 in the cloud over, for example, a network, that operates algorithms and software that can analyze the data and provide usage and activity information of the elevators 14 and 16, which can be downloaded or sent to a user device 34. The user device 34 can be any suitable device for the purposes described herein, such as a mobile phone, tablet, desktop computer, or another device that can run a certain application and alert a property owner, property manager, elevator service company, or another supervising party or machine that one or more of the elevators 14 and 16 is being underutilized, stopped or out of service.

It is generally desirable that the elevators 14 and 16 are utilized at roughly the same rate over a certain period of time to provide efficient operation for passenger use. By utilizing the system 10 described above, the usage rate for each elevator 14 and 16 can be monitored and determined. As the usage rate of the elevators 14 and 16 is being determined and recorded, the server 32 can compare the usage rate of one of the elevators 14 or 16 in the bank 12 to the usage rate of the other elevators 14 and 16 in the bank 12. If the usage rate of one of the elevators 14 or 16 and the usage rate of another one of the elevators 14 or 16 are not equal or substantially equal, or the usage rate of one or more elevators 14 and 16 is zero, or the usage rate of one or more of the elevators 14 or 16 is much lower than the other elevators 14 and 16, or the usage rate of one or more of the elevators 14 and 16 is significantly less than what is normal for a specific time period, an alert can be sent to the user device 34 from the server 32 to indicate that one or more of the elevators 14 and 16 is possibly not operating as it should be and needs to be serviced.

Additionally, one or more of the monitoring devices 30 may fail to properly communicate data or other information related to the elevators 14 and 16 to the server 32 when it should be. When the movement of one of the elevators 14 or 16 or other information related to the elevator 14 or 16 is not communicated to the server 32 in a predetermined period of time, the server 32 may send an alert message to the user device 34 indicating a possible elevator malfunction. Also, the server 32 may communicate the information received from each of the elevators 14 and 16 to every other elevator 14 and 16 so that each of the elevators 14 and 16 is able to determine if it is not being utilized or fully utilized in comparison to the other elevators 14 and 16. Thus, one or more of the monitoring devices 30 may report the failure of any of the other monitoring devices 30 to the server 32.

Figure 2:
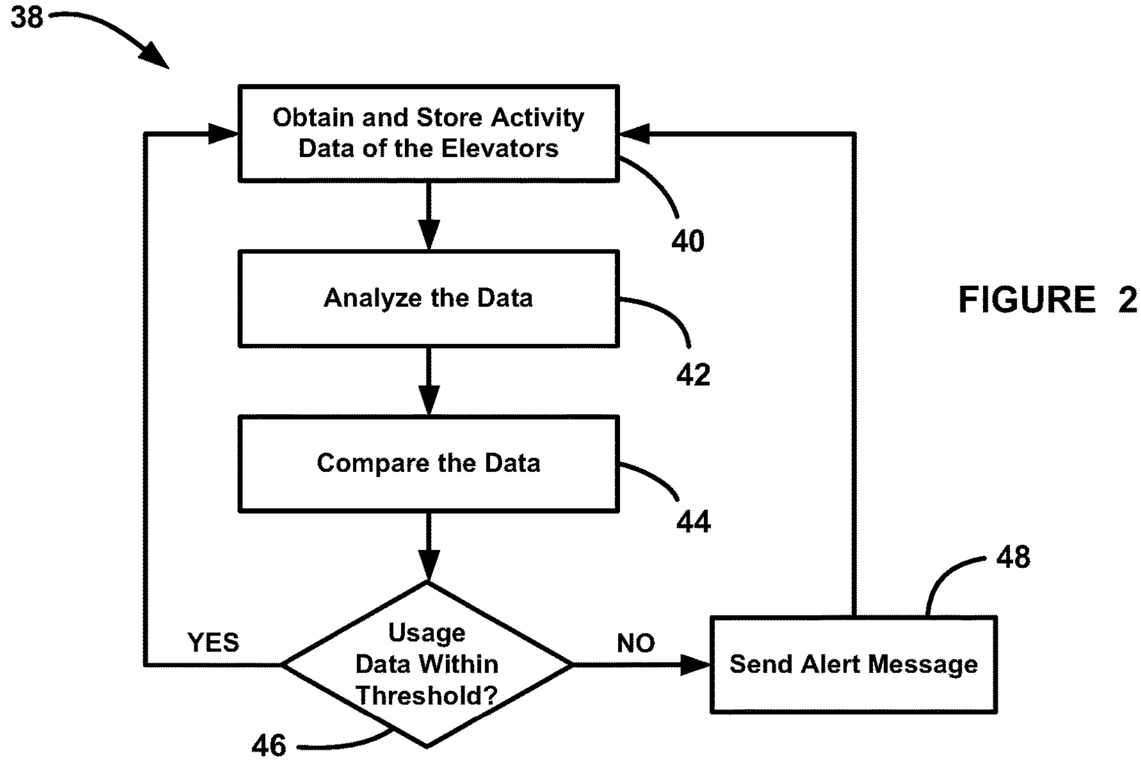
FIG. 2 is a flow chart diagram showing a process for comparing activity and usage of the elevators in the elevator bank to determine elevator shutdown.

FIG. 2 is a flow chart diagram 38 generally showing the method discussed above that determines elevator shutdown or low performance by comparing the usage or trips or other activity of the elevators 14 or 16 to each other during the same period of time or to historical usage of the same elevator 14 or 16. At box 40, the algorithm obtains activity and usage data of each of the elevators 14 and 16 using one or more sensors, discussed below, from the monitoring devices 30 and stores the data on the server 32. This data can be any suitable data consistent with the discussion herein, such as movement of the elevators 14 and 16, the position of the elevators 14 and 16, motion in the elevators 14 and 16, movement of the doors 20 of the elevators 14 and 16, etc. At box 42, the algorithm operating in the server 32 analyzes the data received from the monitoring devices 30 to identify current elevator usage and usage for certain periods of time, such as certain days, certain times of day, etc. At box 44, the algorithm compares the analyzed data of the usage between the elevators 14 and 16 to identify usage of a particular elevator 14 or 16 that is not consistent with previous usage or not consistent with the usage of the other elevators 14 and 16 in the bank 12. For example, the algorithm can determine whether the usage rate of one or more of the elevators 14 or 16 is different than the usage rate of any of the other elevators 14 or 16, or the usage rate of one or more elevators 14 and 16 is zero, or the usage rate of one or more of the elevators 14 or 16 is much lower than the usage rate of the other elevators 14 and 16, or the usage rate of one or more of the elevators 14 and 16 is significantly less than what is normal for a specific time period. At decision diamond 46, the algorithm determines if any of these comparisons or determinations are outside of a predetermined threshold, and if so, sends an alert message to the user device 34 at box 48.

Figure 3:
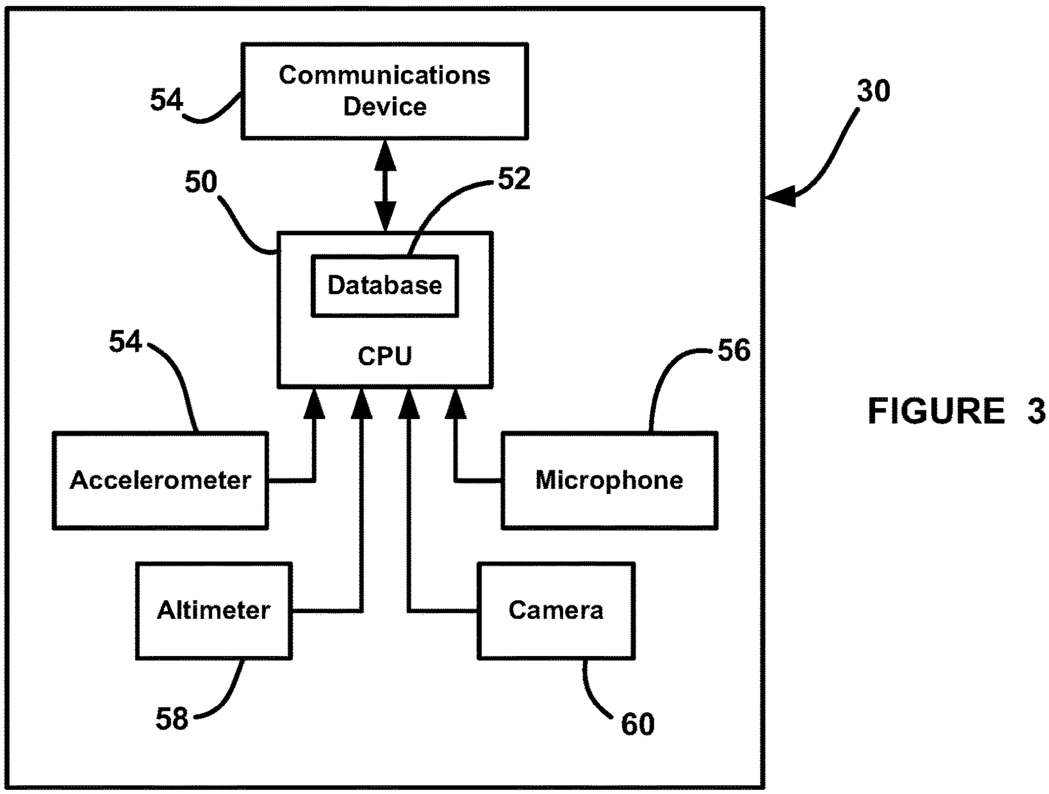
FIG. 3 is a block diagram of the monitoring device separated from the elevator.

FIG. 3 is a block diagram of one of the monitoring devices 30 separated from the particular elevator 14 or 16 to better illustrate some of the various features discussed above. The device 30 includes a central processing unit (CPU) 50 having a database 52 that stores data and operates all of the algorithms and processes employed in the monitoring device 30, as discussed herein, where the CPU 50 can be any suitable processor, microprocessor, etc. The monitoring device 30 includes a communications device 54 that allows the device 30 to communicate with the server 32, and may include one or more of a cellular modem, an Ethernet connection, Bluetooth capability, a wireless LAN adapter, etc. The CPU 50 receives signals from one or more sensors discussed below related to elevator usage and activity that is processed and sent to the server 32 by the communications device 54. The server 32 receives the information from each of the monitoring devices 30 in the system 10 and compares the relative usage of each of the elevators 14 and 16 over a selected period of time with the usage of the other elevators 14 and 16 during that time or a similar time as discussed above.

The monitoring device 30 can include any number of or type of sensor that is able to provide data of the type discussed herein. In this non-limiting embodiment, the monitoring device 30 includes an accelerometer 54 that detects movement of the elevator 14 or 16 and sends elevator movement data to the CPU 50. The algorithm operating in the CPU 50 can use the movement data to determine that a trip has occurred each time the elevator 14 or 16 starts and stops moving, and logs the trips for the elevator 14 or 16 in the database 52 with a timestamp. The algorithm creates a historical log of the number of the trips during a given time period (e.g. one hour) on a given day of the week (e.g. Saturday) and compares the number of trips for the elevator 14 or 16 in the "current" time period to the expected number of trips on the same day of the week and time from the historical log.

The location of the elevator 14 or 16 in the hoistway 22 can also be determined by using the data from the accelerometer 54. As discussed, the accelerometer 54 detects movement of the elevator 14 or 16 over time and sends the elevator movement data to the CPU 50. An algorithm operating in the CPU 50 uses the movement data to determine the speed at which the elevator 14 or 16 has moved and the time it took to move to determine at what location in the elevator hoistway 22 the elevator 14 or 16 has stopped. The algorithm logs the locations in the elevator hoistway 22 where the elevator 14 or 16 stops regularly, where the elevator 14 or 16 should only stop at elevator landings within the building.

The monitoring device 30 can also include a microphone 56 that detects sounds in and around the elevator 14 or 16, and those sounds can be used to determine whether the elevator doors 20 are opening and closing without the elevator 14 or 16 moving. More particularly, the microphone 56 captures sounds in the elevator hoistway 22 and sends audio files of the sounds to the CPU 50, where an algorithm operating in the CPU 50 converts the audio files into audio fingerprints that connect a certain sound to a certain thing. Since the elevator doors 20 make a consistent sound when they open and close, the algorithm can categorize which of the audio fingerprints are the elevator doors 20 opening and closing. By using data from the accelerometer 54 indicating elevator movement over time, the algorithm can determine if the elevator doors 20 are being repeatedly opened and closed without the elevator 14 or 16 moving during the same time period.

The monitoring device 30 can also include an altimeter 58 that detects the pressure of the air surrounding the elevator 14 or 16 at a given point in time and sends the air pressure data to the CPU 50. An algorithm operating in the CPU 50 calculates the altitude of the elevator 14 or 16 based on the air pressure to identify the location of the elevator 14 or 16, and thus the CPU 50 can generate a log of the locations where the elevator 14 or 16 regularly stops.

The monitoring device 30 can also include a camera 60 that can detect motion in the elevators 14 or 16 or motion of the doors 20, and provide digital images to the CPU 50. The camera 60 can be positioned within the elevator car 18 and can be hard-wired to the CPU 50.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for detecting shutdown or incorrect operation of one or more elevators, said method comprising:

obtaining usage data of at least two elevators using one or more sensors that identifies usage of the elevators;

comparing the usage data of the at least two elevators; and determining that one of the elevators has shut down or is operating incorrectly if its usage data is outside of a predetermined threshold of usage data of other elevators.

2. The method according to claim 1 wherein the usage data includes movement of the elevators.

3. The method according to claim 1 wherein the usage data includes position of the elevators.

4. The method according to claim 1 wherein the usage data includes number of trips of the elevators.

5. The method according to claim 1 wherein the usage data includes motion in the elevators.

6. The method according to claim 1 wherein the usage data includes movement of doors of the elevators.

7. The method according to claim 1 wherein the one or more sensors includes an accelerometer that detects movement of the elevator.

8. The method according to claim 1 wherein the one or more sensors includes a microphone that detects sounds in and around the elevator.

9. The method according to claim 1 wherein the one or more sensors includes an altimeter that detects air pressure around the elevator.

10. The method according to claim 1 wherein the one or more sensors includes a camera that detects motion in the elevator or motion of doors of the elevator.

11. The method according to claim 1 wherein obtaining usage data of each of the elevators includes using a control box mounted to the elevators that includes a processor, a communications device and a plurality of sensors.

12. The method according to claim 11 wherein comparing the usage data and determining that one of the elevators has shut down or is operating incorrectly is performed at a remote server from the elevators that receives the usage data from the communications device in the control box.

13. The method according to claim 1 further comprising sending an alert message to a user device if it is determined that the usage data of the one elevators is outside of a predetermined threshold of the usage data of the other elevators.

14. The method according to claim 1 wherein the one or more elevators are associated with a bank of elevators.

15. A method for remotely detecting shutdown or incorrect operation of one or more elevators associated with a bank of elevators, said method comprising:

providing a control box mounted to each elevator that includes one or more sensors that can detect movement of the elevator, a processor that can process data received from the one or more sensors and a communications device that can transmit the processed data;

determining a usage rate of the movement of each of the elevators in the processor using the data;

transmitting the usage rate from each of the communications devices to a remote server;

comparing the usage rate of each of the elevators to the usage rate of other elevators in the server; and determining that one of the elevators has shut down or is operating incorrectly if its usage rate is outside of a predetermined threshold of the usage rate of the other elevators.

16. The method according to claim 15 further comprising sending an alert message to a user device if it is determined that the usage rate of the one elevator is outside of a predetermined threshold of the usage rate of the other elevators.

17. The method according to claim 15 wherein the one or more sensors includes one or more of an accelerometer that detects movement of the elevator, a microphone that detects sounds in and around the elevator, an altimeter that detects air pressure around the elevator, and a camera that detects motion in the elevator or motion of doors of the elevator.

18. The method according to claim 15 further comprising determining in the remote server that usage rate information is not being received from one of the control boxes, and providing an alert if the information is not received.

19. The method according to claim 15 further comprising sending the usage rate of each of the elevators from the remote server to the control box of each of the other elevators.

20. A system for detecting shutdown or incorrect operation of one or more elevators, said system comprising:

means for obtaining usage data of at least two of the elevators using one or more sensors that identifies usage of the elevator;

means for comparing the usage data of the at least two elevators; and means for determining that one of the elevators has shut down or is operating incorrectly if its usage data is outside of a predetermined threshold of usage data of other elevators.

* * * * *